US006013154A

United States Patent [19]

Thomas-Cote

[11] Patent Number: 6,013,154

[45] Date of Patent: Jan. 11, 2000

[54] TRANSFERABLE INDEX TABS

[75] Inventor: Nancy Thomas-Cote, Long Beach, Calif.

[73] Assignee: Barbara Thomas Enterprises, Inc., Seal Beach, Calif.

[21] Appl. No.: 08/851,377

[22] Filed: May 5, 1997

[51] Int. Cl.[7] .................................................... B32B 31/00

[52] U.S. Cl. .......................... 156/277; 156/247; 156/268; 156/230; 283/70; 283/81; 283/36

[58] Field of Search ................................ 283/67, 70, 81, 283/36, 37, 41, 47; 156/277, 268, 278, 247, 252, 257, 230

[56] References Cited

U.S. PATENT DOCUMENTS

| | | | |
|---|---|---|---|
| 3,586,160 | 6/1971 | Helmann . | |
| 3,926,744 | 12/1975 | Heimann . | |
| 4,560,600 | 12/1985 | Yellin et al. . | |
| 4,876,131 | 10/1989 | Ashby et al. | 428/41.5 |
| 4,925,716 | 5/1990 | Haas . | |
| 4,939,674 | 7/1990 | Price et al. . | |
| 4,972,615 | 11/1990 | Grant | 40/641 |
| 5,080,399 | 1/1992 | Olson . | |
| 5,123,676 | 6/1992 | Donnelly et al. . | |
| 5,135,261 | 8/1992 | Cusack et al. . | |
| 5,340,427 | 8/1994 | Cusack et al. | 156/268 |
| 5,343,647 | 9/1994 | Bulka | 40/630 |
| 5,389,414 | 2/1995 | Popat | 428/40 |
| 5,407,718 | 4/1995 | Popat et al. | 428/42 |
| 5,468,085 | 11/1995 | Kline | 402/79 |
| 5,503,435 | 4/1996 | Kline | 283/67 |
| 5,543,191 | 8/1996 | Dronzek, Jr. et al. . | |
| 5,571,587 | 11/1996 | Bishop et al. | 428/43 |

*Primary Examiner*—Merrick Dixon
*Attorney, Agent, or Firm*—Fulwider Patton Lee & Utecht, LLP

[57] ABSTRACT

A computer printer compatible index tabs assembly that includes a carrier sheet recognizable by any of a wide variety of computer compatible printing devices. The carrier sheet includes a plurality of self-adhesively secured tabs each formed from a resilient, durable thin film. The self-adhesive is formulated to either permanently or releasably adhere to a peripheral edge of a sheet of material which is to be tagged, labeled or indexed. After printing, the index tab is transferred from the carrier sheet and positioned with the self-adhesive securing the index tab to the sheet of material and with the indicia projecting outwardly from the edge for convenient display.

3 Claims, 4 Drawing Sheets

TRANSFERABLE INDEX TABS

BACKGROUND OF THE INVENTION

1. Field of the Invention

The present invention relates to labels, tags, indexing tabs and the like which are removably and self-adhesively secured to a carrier sheet which has a standard, predetermined size compatible for use with a computer based software program or word-processor template preconfigured to print indicia on the index tabs using computer compatible laser printers, inkjet printers, thermal resistive transfer printers, custom label printers, impact printers and similar printing devices, which index tabs may be transferred after printing from the carrier sheet onto a document, file folder, sheets of material or other desired surface to be labeled, tagged or indexed.

2. Description of the Prior Art

Efforts have been made in the past to develop label or index tabs which are compatible with a variety of computer printers for printing of indicia directly on the labels for creating custom label or index tabs having a professional appearance. One such product is described in U.S. Pat. No. 5,135,261 issued to Cusack et al. on Aug. 4, 1992 which discloses an index tab label assembly having a divider sheet with an integral tab protruding from a side edge. The assembly includes a sheet of pressure sensitive label material affixed with a releasable, pressure sensitive adhesive to a backing sheet. The label material is perforated in a series of rows and columns thereby creating labels sized to fit over the integral tabs of the dividers. The sheet is passed through a laser printer or similar printing device to print indicia on the label material. Thereafter, the individual labels are peeled from the backing sheet and affixed to the integral tabs to create custom labeled divider tabs.

Disclosed in U.S. Pat. No. 5,571,587 issued to Bishop et al. on Nov. 5, 1996 is a sheet stock assembly compatible for use with computer printers to print indicia on the sheet stock. In one embodiment, a backing sheet is formed with a label material which in combination are pre-scored with perforations to form peelable labels having various desired shapes and sizes. After printing on the label material has been completed, the label is peeled apart from the backing sheet and affixed with a pressure sensitive adhesive to a desired document surface. In another embodiment, the sheet stock assembly comprises a heavy weight paper stock fabricated with pre-scored perforation having the shape of either a file divider card or a Rolodex (tm) type address card. Once indicia have been printed on the blank sheet stock, the sheet stock may be separated at the perforations forming the respective file divider sheet or address card. The leftover material removed when the perforations are separated is discarded.

Similar methods and devices are described in U.S. Pat. No. 5,503,435 issued to Kline on Apr. 2, 1996, U.S. Pat. No. 4,560,600 issued to Yellin et al. on Dec. 24,1985, and U.S. Pat. No. 5,123,676 issued to Donnelly et al. on Jun. 23, 1992.

SUMMARY OF THE INVENTION

The computer printer compatible index tabs of the present invention arc directed to an assembly of index tabs mounted to a carrier sheet compatible for use with a wide variety of computer printers and software in a configuration which eliminates the many disadvantages of previously available custom index labeling assemblies.

Problems associated with previous devices include unsuitability for indexing a previously bound document or the like. Many of the previous devices require the fabrication of an integral tab on a divider to receive the custom printed label to the integrally formed tab. Also, the previous devices are often limited to permanent attachment of the custom printed label. Other embodiments of the previous devices incorporate substantial extra material to enable passage of blank sheet stock having pre-scored perforations defining a desired shape, such as a file divider sheet, through a printing device. After printing of custom indicia, the extra material must be manually separated along the pre-scored perforations and discarded. The need for such extra, discarded material is wasteful and adds unnecessary expense to the previous devices in addition to inconvenience to the user.

One object of the present invention is to overcome the above-identified shortcomings of the previous devices. What has been needed and heretofore unavailable until the present invention is an index tab assembly which is compatible with a variety of computer printers and software and which comprises a self-contained, self-adhesive durable, resilient and flexible tab suitable for efficiently indexing, tagging and labeling pages of bound documents and the like in a temporary or permanent manner while providing a professional custom-printed appearance.

It is another object of the invention to provide an index tab assembly compatible with various types of computer printing devices including laser, inkjet, thermal resistive transfer, custom label, and impact printers in addition to being compatible with many previous, well-known means of imprinting indicia on tabs such as photocopiers, typewriters and handwriting.

Yet another object of the present invention is to provide an index tab assembly which is easier to use than previous devices and which minimizes or eliminates the wasteful, uneconomical, and inefficient attributes and overcomes the disadvantages of the previous devices.

The embodiments of the present invention achieve these and other objects in addition to other advantages by providing an index tab assembly and a method of making same wherein a plurality of self-adhesive, durable and resilient index tabs are releasably affixed to a carrier sheet having a predetermined size compatible for use in any one of a variety of computer compatible printing devices. The tabs are each formed from a thin film shaped to have two laterally opposed first and second portions with a thickness sufficient to withstand long-term use while maintaining adequate flexibility as is required to pass through the reentrant printing paths encountered in various types of computer compatible printing devices. The back side of the first portion is coated with an adhesive formulated to releasably secure the tabs to the carrier sheet and to be resistant to heat and frictional stresses encountered during printing. The top side of the second portion is coated with a background for improving the appearance of the printed indicia and a receiver coating for enhancing the receptivity of the tab printing surface to printing of indicia by laser, inkjet, thermal resistive transfer, custom label, impact printing devices as well as other similar printing devices.

Additional novel features and advantages over previous devices and objects of the inventor will become readily apparent from the following detailed description of preferred embodiments of the present invention, when taken in conjunction with the accompanying drawings.

BRIEF DESCRIPTION OF THE DRAWINGS

Referring now to the drawings wherein like reference numerals across the several different views refer to identical or corresponding parts.

DETAILED DESCRIPTION OF A PREFERRED EMBODIMENT

Figure 1:
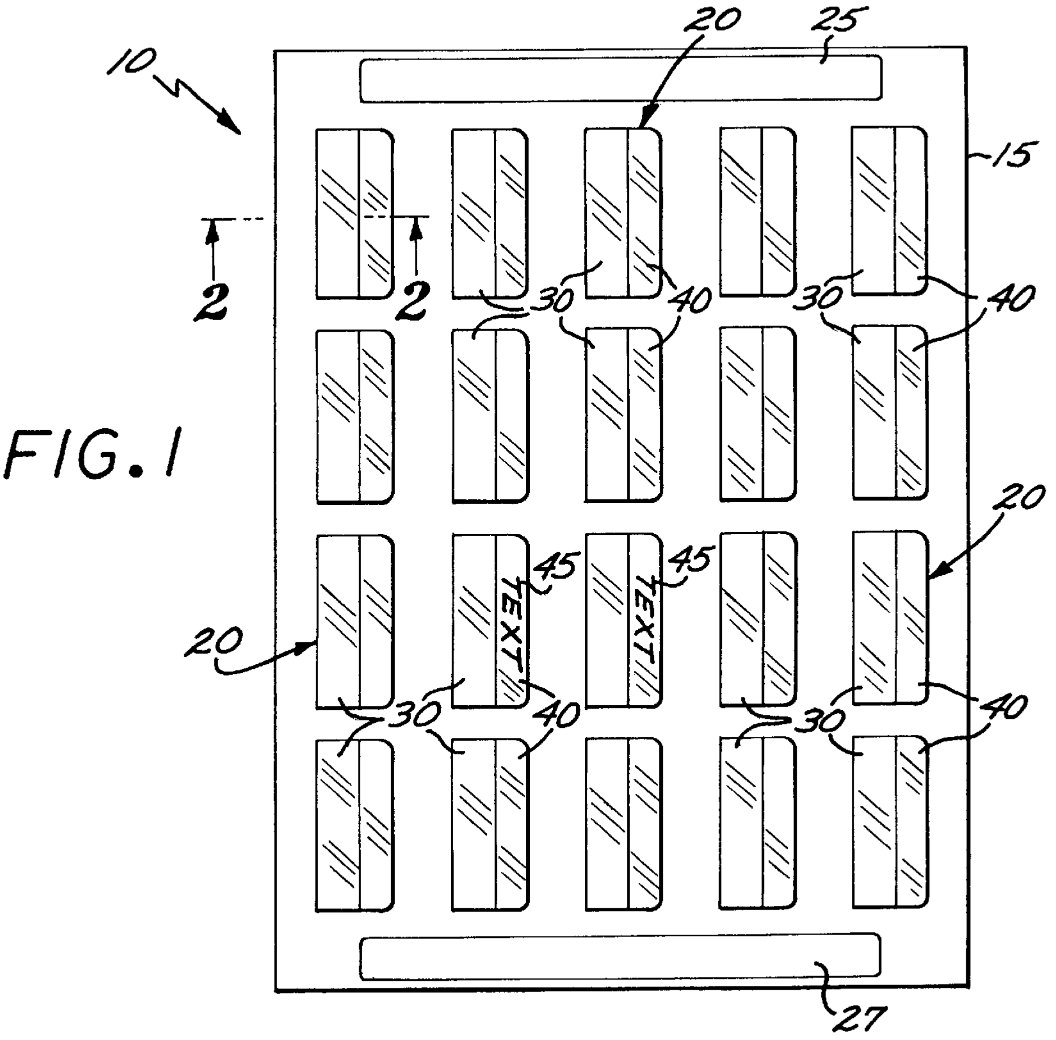
FIG. 1 is a top plan view of a computer printer compatible index tab assembly embodying the present invention.

As shown in the drawings for purposes of illustration, the present invention comprises a computer printer compatible index tab assembly and a method of making same which obviates many of the problems associated with labeling, tagging and indexing of bound documents and sheets of material grouped and sometimes bound together. The index tab assembly incorporates a series of index tabs removably and self-adhesively secured to a carrier sheet. The carrier sheet is of a standard size recognizable to any of a wide-variety of computer compatible laser printers, inkjet printers, thermal resistive transfer printers, custom label printers, impact printers, and similar printing devices.

The computer printer compatible index tab assembly is readily adapted for use of a user to facilitate quick and efficient entry of indicia into a computer for printing on the index tab assembly. Once the desired indicia have been printed by the user, the self-contained, self-adhering, pressure-sensitive index tabs may be peeled from the carrier sheet and, for example, permanently or removably affixed to the side or bottom peripheral edge of the page of the document which is to be tagged, labeled or indexed.

Figure 2:
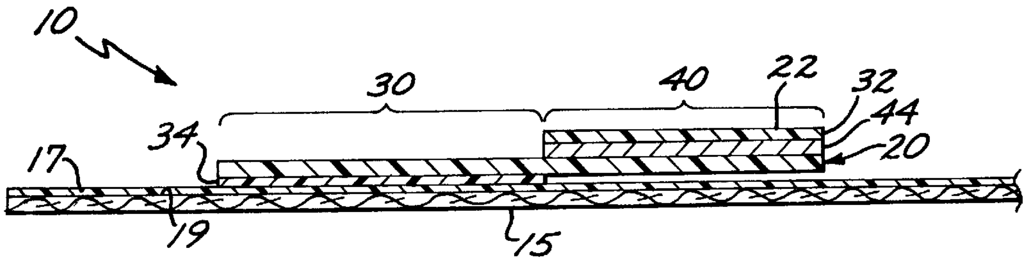
FIG. 2 is a vertical-sectional view, taken in enlarged scale, along the section line 2—2 of FIG. 1.

Referring now to the drawings, a first preferred form of the computer printer compatible index tab assembly according to the present invention is illustrated in FIG. 1 and shown generally at reference numeral 10. As depicted in FIGS. 1 & 2, such assembly 10 includes a paper liner or carrier sheet 15 having a plurality of tabs 20 secured thereto. Although a paper carrier sheet is incorporated in the preferred embodiment, those with skill in the art will understand that many equally suitable equivalents are available. Additionally, at least one traction strip 25 may be mounted along a peripheral edge of the carrier sheet 15 to ensure a smooth feed of the paper carrier sheet 15 through a conventional computer compatible printing device 28 of the type shown in FIG. 4. Alternative embodiments may include additional traction strips 27 spaced apart from the traction strip 25 disposed either some predetermined distance away from the traction strip 25 or positioned along a different peripheral edge of the carrier sheet 15 as required for the particular application.

The paper carrier sheet 15 is configured to have a predetermined size which is recognizable to any of a wide variety of computer compatible printing devices 28. For example, when used with laser, inkjet, thermal resistive transfer or impact printing devices 28, the paper carrier sheet 15 of the first preferred embodiment and 15' of the second preferred embodiment, as depicted respectively in FIGS. 1 and 3, would have a generally rectangular shape with a predetermined size of 8 ½ inches by 11 inches (FIG. 1), 8 ½ inches×7 ¼ inches (FIG. 3, the second preferred embodiment), or 4 ⅛ inches by 9 ½ inches (the size of a #10 envelope, an additional embodiment not shown). Each of these example sizes comply with standard dimensions recognizable by many widely available, computer compatible printing devices 28. The paper carrier sheet 15 is also fabricated to include a release coating 17 disposed on a mounting surface 19 of the carrier sheet 15. The release coating 17 is preferably a silicone based film formulated to have a release level, known to those with skill in the art, of "L-12." This release level configuration ensures that the releasable index tabs 20 are securely mounted to the mounting surface 19 as the index tab assembly 10 moves through the printing path of the printing device 28. Although the thickness of the release coating 17 of the preferred embodiment is approximately 0.1 mils to 0.2 mils (about 0.0001 inches to 0.0002 inches), different thickness may be utilized so long as the desired release level of L-12 is maintained and such that the total. combined thickness of the 40 pound weight paper carrier sheet 15 plus the release coating 17 does not exceed approximately 2.5 mils to 3.0 mils (approximately 0.0025 inches to 0.0030 inches). As stated, many suitable types of liners or carrier sheets 15, 15' are available which would satisfy the objectives of the present invention. As an illustrative example, the first preferred embodiment may incorporate the 40 pound weight, L-12 release level, semi-bleaclhed, silicone liner paper available from 3 Sigma (A subsidiary of Anchor Continental & CTI Coating Technologies International) of Columbia, S.C. and Covington Ohio.

Index tabs 20 are fabricated with a durable, resilient thin film which may be comprised of a polyester material such as P.E.T., otherwise known to those with skill in the art as a formulation of polyester called polyethylene terephtlialate. Such material is readily available from manufacturers such as Dupont under the tradename Mylar (tm) or Revval (tm). The Revval (tm) thin film is also available from 3 Sigma under license from DuPont. Although many methods known to those with ordinary skill in the art may be employed, as described in more detail below, to treat the thin film to make it better receptive to printing by the above-described conventional printing devices, one such treatment includes an acrylic based top-coat formulation which may be applied by the manufacturer of the polyethylene terephthalate, thin film material. As an illustrative example, Dupont offers polyethylene terephthalate under the tradename Revval (tm) which comprises a recycled polyester that is subjected to an acrylic wash coat to wash some of the recycling by-products from the surface of the polyethylene terephthalate thin film. The wash step leaves a small amount of residue of the wash solution which thereby improves the receptivity of the thin film to printing. Rayven of Minnesota offers similar products. The above-described top-coat formulation also improves the receptivity of the thin film material to a background coating 44 which is described in more detail below. In the preferred embodiment, the thin film is also transparent and is approximately 3.0 to 4.0 mils thick (approximately 0.003 inches to 0.004). This thickness ensures that the tabs 20 will withstand repeated and long-term use without premature deterioration and failure while being substantially thin enough in cross-section to pass properly through the various printing devices without causing damage or jamming. Also, the same or a similar material of an approximately equivalent thickness may be used for the traction strips 25 and 27. Most conventional computer compatible printing devices are only capable of printing, by use of their respective reentrant printing paths, on a material no greater than approximately 3.8 mils (approximately 0.0038 inches). Using the manual, single sheet, straight paper path (non-reentrant) feed capability of many of these same printing devices, sheets of material may be printed upon which have a thickness of approximately 3.9 mils to 7.0 mils, or more (approximately 0.0039 inches to 0.007 inches). These requirements are met by the present invention which incorporates a 40 pound weight paper carrier sheet 15 having a thickness of approximately 2.5 mils in combination with a thin film material for the index tabs 20 having a thickness of approximately 3.0 mils to 4.0 mils for a combined maximum thickness of approximately 5.5 mils to 6.5 mils (approximately 0.0055 inches to 0.0065 inches).

Figure 3:
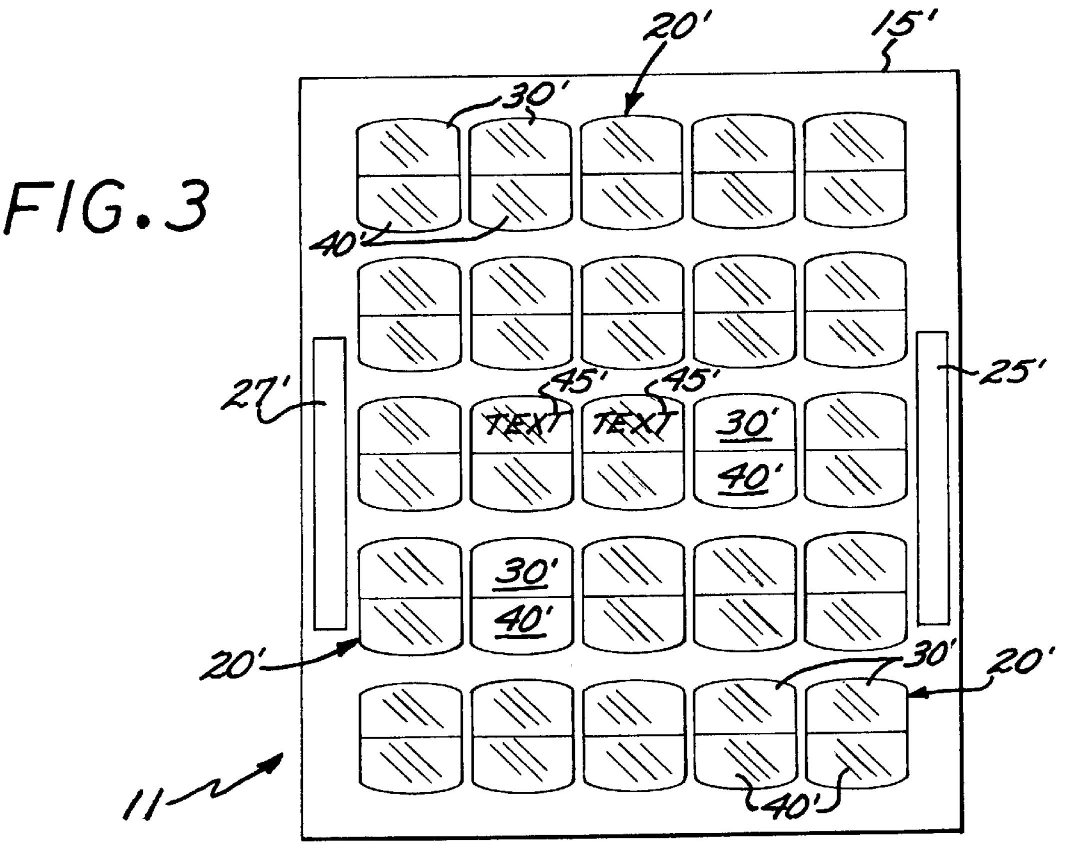
FIG. 3 is a top plan view of a second embodiment of computer printer compatible index tab assembly of the present invention with a different, predetermined size from that shown in FIG. 1.

The index tabs 20 shown in FIGS. 1 & 2 are formed with two laterally opposed portions. The first portion is a securement half 30 and the second portion is an opposite indicia half 40. The securement half 30 includes an adhesive surface on an underside with a transparent, pressure-sensitive, self-adhesive 34 disposed thereon. The adhesive 34 is formulated to releasable secure the adhesive surface of the index tab 20 to the mounting surface 19 of the paper carrier sheet 15 so as to cooperate with the release coating 17 such that the index tab 20 will not slip from its mounted position, as shown in FIGS. 1 and 3, relative to the paper carrier sheet 15 during passage through the printing device 28 for printing. The preferred embodiment incorporates adhesive formulations well-known to the art and capable of withstanding the frictional forces encountered during passage through the paper path of the commonly available printing devices as well as the approximately 400° Fahrenheit temperatures encountered in many types of laser and thermal resistive transfer printing devices. It may also be possible to use a conventional plastic liner paper.

Figure 5:
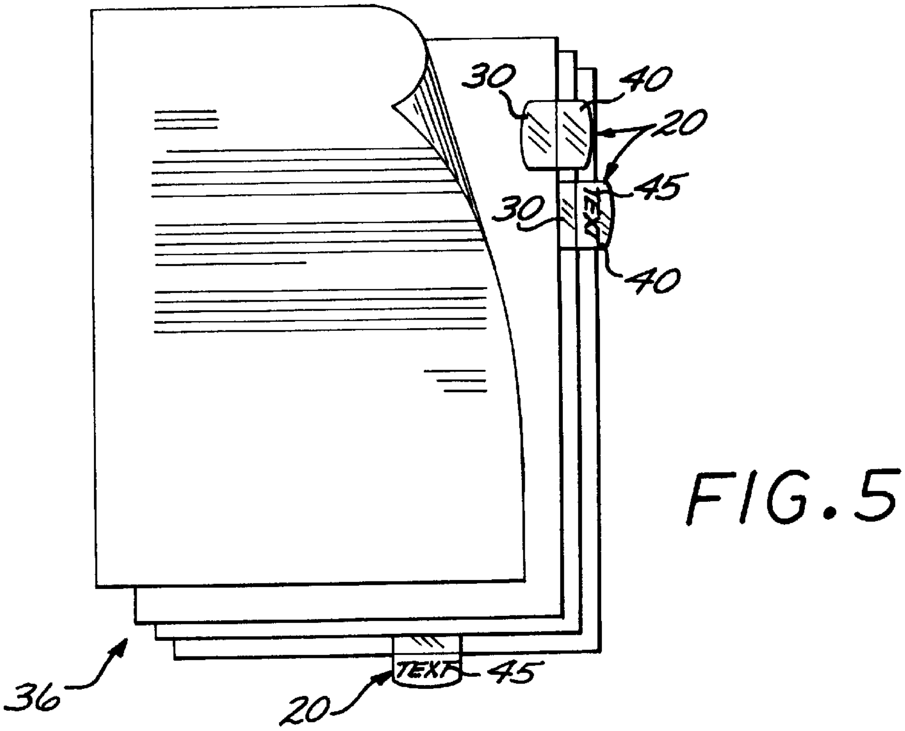
FIG. 5 is a top planar view, in reduced scale, of some of the index tabs in FIG. 1 which have been transferred from the index tab assembly to side edges and a bottom edge of a sheet of material to be indexed, labeled or tagged.

Additionally, the adhesive 34 is further formulated in one preferred embodiment to permanently adhere to the side, top or bottom peripheral edge of the sheet of material 36, as shown in FIG. 5, which is to be tagged, labeled or indexed. One such illustrative example of an adhesive which satisfies this objective of the invention is the A-106 permanent, hot melt adhesive available from 3 Sigma of Columbia, N.C. In an alternative configuration of the preferred embodiment, the adhesive 34 is formulated to removably secure the tabs 20 in their desired labeling or indexing positions. An example of an adhesive satisfying this objective is either the A-204 or DFC-205 removable, hot melt adhesive which is also available from 3 Sigma.

The indicia half 40 of the tab 20 includes a printing surface 22 on a top side of the index tab 20 which is manufactured with a receiver coating 42 formulated to receive the indicia 45 on the printing surface 22 when printed by the computer compatible printing device 28. Many such receiver coatings 32 are known to the art but the preferred embodiment incorporates a receiver coating 32 which is known to the art as a matte or semi matte varnish. An example of such a coating is the FILM Imprintable Matte Overprint Varnish available from Environmenetal Inks of Ontario, Calif. The receiver coating 32 formulation of the preferred embodiment readily accepts printed indicia 45 from any of the above-referenced printing devices equally well in addition to enabling receipt of printed indicia 45 from well-known printing means, including photocopiers, typewriters and handwriting with pens and pencils.

The first preferred embodiment incorporates a paper carrier sheet 15 which has a rate of thermal expansion which is different than the rate of thermal expansion for the thin film materials of the present invention. As a result, it is preferable to fabricate the index tab assembly 10 such that what is commonly known as the "matrix" is removed from the index tab assembly 10 during manufacture of the assembly 10, before it is used in one of the printing devices for printing indicia 45 on the index tabs 20. During the manufacture of the preferred embodiment, the carrier sheet 15 is joined with a similarly sized sheet of the thin film material which will comprise the index tabs 20. After the two layers of material have been joined together, the pattern of index tabs is scored from the thin film material while avoiding the scoring of the underlying carrier sheet. The matrix (not shown) comprises the thin film material residing between the index tabs 20 after the pattern of the labels has been scored. To eliminate problems which would result from the different rates of thermal expansion between the two materials, the matrix is removed from the assembly 10 during fabrication.

Figure 2A:
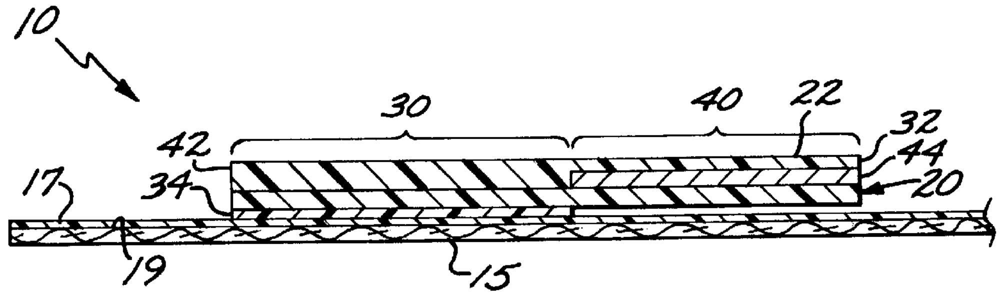
FIG. 2A is a view similar to FIG. 2 showing a modification of the arrangement of FIG. 2.

In alternative modifications, the receiver coating 32 may be applied across the securement half 30 as well as the indicia half 40 by reference numerals 32, as shown in FIG. 2, and 42, as shown in FIG. 2A, for situations where it is desirable to print indicia 45 across the entire printing surface 22. However, such printing may be undesirable where the transparent securement half 30 is placed upon information contained on the page of the document 36 or the sheet of material 36.

Figure 2B:
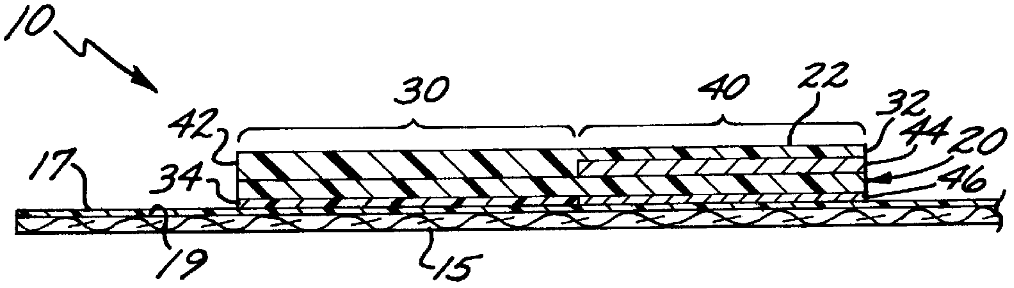
FIG. 2B is another view similar to FIG. 2 showing a second modification of the arrangement of FIG. 2.

It is preferred to also apply a background coating 44 beneath the receiver coating 32 on the indicia half 40 of the tabs 20 to enhance or improve the professional appearance of the indicia 45, as shown in FIG. 2. The background coating 44 may comprise an opaque white finish or may be colored as desired by a particular application. Alternatively, the background coating 44 may be applied to the underside of the indicia half 40 as shown by reference numeral 46 of FIG. 2B in the instance where the tab 20 is fabricated from a translucent or transparent thin film material. In yet another alternative configuration, the background coating 44 may be applied to the bottom side of the indicia half 40 as indicated by reference numeral 46 instead of or in combination with application of the background coating 44 on the top side of the tab 20 as can be understood from FIG. 2B. Further, the background coating may also be applied to the securement half 30 of the tab 20. However, such an extension of the background coating may be undesirable where the transparent securement half 30 is placed upon information contained on the page of the document 36 or the sheet of material 36 which must remain visible after application of the tab 20. While many types of background coatings may work equally well to accomplish the objectives of the present invention, the FILM III water-based inks and coatings available from Environmental Inks of Ontario, Calif. are incorporated in the first preferred embodiment.

Figure 4:
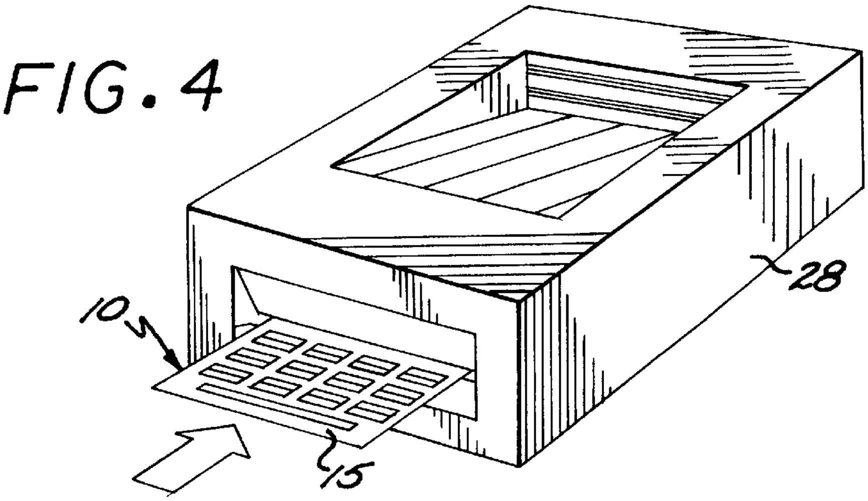
FIG. 4 is a perspective view, in reduced scale, of a computer compatible printer in operation and receiving the compatible index tab assembly of FIG. 1.

In operation, the computer printer compatible index tab assembly 10 is positioned to be fed through a printing device 28 as shown in FIG. 4. Next, the user operates a conventional computer (not shown) to run any one of a number of software programs or word-processor compatible templates (not shown), such as the BTE Laser Printer Tab software available from Barbara Thomas Enterprises, Inc., of Huntington Beach, Calif., which are configured to simplify the printing of indicia 45 on the index tab assembly 10 of the present invention. These software based templates are preconfigured to correspond with any of a number of the above, and other similar but differently sized, embodiments of the present invention. The templates are compatible with a number of widely-available word processing software applications. The user then inputs the desired indicia 45 into the software program or word-processor template and instructs the computer to begin printing of the indicia on the printing device 28. Once the indicia 45 have been printed, the tabs 20 may be peeled away from the paper carrier sheet 15 and transferred to the sheets of material 36 for tagging, labeling, or indexing thereof. The index tab 20 is positioned with the self-adhesive securement half 30 securing the index tab 20 to the sheet of material 36 and with the indicia 45 on the indicia half 40 projecting outwardly from the edge for convenient display.

Figure 6:
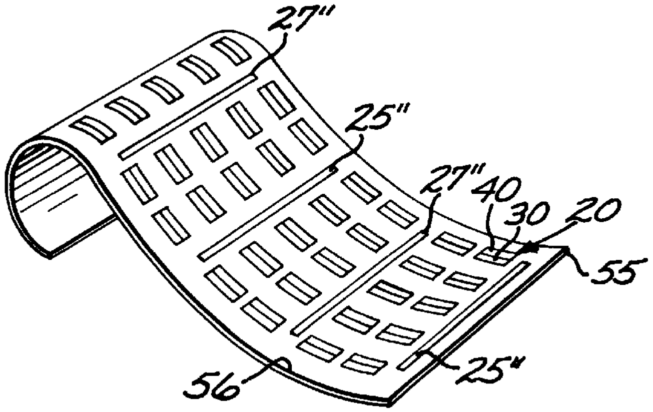
FIG. 6 is a perspective view, in reduced scale, of a third embodiment of a computer printer compatible index tab assembly fabricated in a continuous roll configuration.

While multiple forms of the invention have been illustrated and described, it is readily apparent that various modifications can be made without departing from the spirit and scope of the invention. For example, in a third preferred embodiment, the paper carrier sheet 15 of the present invention may be sized to be compatible with printing devices requiring a continuous supply, or a generally elongated length, of an index tab assembly 50 such as that shown in FIG. 6. In this illustrative depiction of another preferred embodiment, the index tabs 20 are secured to a continuous paper or plastic carrier sheet 55 having a mounting surface 59 using the same configuration of tabs 20 as well as the release coating 17, receiver coating 32, adhesive 34, and background coating 44, 46 formulations described above for the first preferred embodiment. The paper or plastic carrier sheet 55 in manufactured in a rolled configuration as shown and the index tabs 20 are distributed in a repeating sequence arrangement with traction strips 25 and 27 sequentially disposed in a similar fashion.

Although the best mode contemplated by the inventor of practicing the preferred embodiments of the present invention are described above, many types of material, arrangements of index tabs 20 on carrier sheets 15, 55 and cross-sectional configurations of index tabs 20, thin film materials, release coatings 17, adhesives 34, and background coatings 46 may be substituted without departing significantly from the capability and intended objectives of the preferred embodiments. Similarly, the other above-described components are obtained from vendor sources readily known to those having ordinary skill in the art and are comprised by materials suitable for use with the above described structure and operation of the instant invention.

The preceding description of the preferred embodiment and the best mode for practicing the invention are provided for illustration purposes only and not for the purpose of limitation; the invention being defined by the claims.

What is claimed is:

1. A method for identifying a sheet of material by a transferable index tab, said method comprising the steps of:

providing a carrier sheet having an upper mounting surface upon which is disposed a release coating;

providing a thin film, the underside of which has adjacent rows of pressure sensitive adhesive coated surfaces and parallel rows of identifying surfaces which are not coated with said adhesive;

joining said carrier sheet to said thin film with said adhesive surfaces positioned against said mounting surface and said pressure sensitive adhesive cooperating with said release coating to releasably secure said thin film to said carrier sheet;

scoring said thin film without scoring the carrier sheet to form a pattern of index tabs;

passing the joined together carrier sheet and thin film through a printing device so as to print indicia on the upper surfaces of the index tabs;

individually peeling said index tabs from the carrier sheet by individually removing said index tabs by said surface not coated with said adhesive; and affixing the adhesive surface of said index tabs to a peripheral edge of sheets of material to be identified, with said index tabs identifying surface extending outwardly of such peripheral edge so as to identify such sheet of material.

2. A method as set forth in claim 1 wherein the portion of the thin film containing the adhesive coated surfaces is transparent.

3. A method as set forth in claim 1 which includes the further step of scoring a portion of the adhesive coated surface of the thin film to provide a traction strip on the thin film and wherein the printing step is accomplished by passing the carrier sheet and thin film through a computer based printer, with the traction strip effecting a smooth feed of the carrier sheet through the printer.

* * * * *